United States Patent
Iwasa et al.

[11] Patent Number: 5,999,724
[45] Date of Patent: Dec. 7, 1999

[54] BUSINESS PROCESS SIMULATION SYSTEM

[75] Inventors: Mototsugu Iwasa; Hiromasa Nemoto, both of Yokohama; Hirofumi Kondoh, Yamato; Hirotoshi Ise, Kawasaki, all of Japan

[73] Assignee: Hitachi, Ltd., Tokyo, Japan

[21] Appl. No.: 09/257,499

[22] Filed: Feb. 25, 1999

Related U.S. Application Data

[63] Continuation of application No. 08/582,628, Jan. 4, 1996, Pat. No. 5,887,154.

[30] Foreign Application Priority Data

Jan. 6, 1995 [JP] Japan .................................. 7-000506

[51] Int. Cl.$^6$ ........................................... G06F 9/455
[52] U.S. Cl. ........................... 395/500.43; 395/500.34
[58] Field of Search .......................... 395/680, 155, 395/182.18, 500.34, 500.42, 500.43, 500.38, 500.41; 705/7, 8, 9

[56] References Cited

U.S. PATENT DOCUMENTS

| | | | |
|---|---|---|---|
| 5,535,322 | 7/1996 | Hecht | 395/155 |
| 5,634,127 | 5/1997 | Cloud et al. | 395/680 |
| 5,638,508 | 6/1997 | Kana et al. | 395/182.18 |
| 5,767,847 | 6/1998 | Mori et al. | 345/329 |
| 5,867,824 | 2/1999 | Saito et al. | 705/9 |
| 5,878,398 | 3/1999 | Tokuda et al. | 705/8 |

OTHER PUBLICATIONS

Tan et al., Modeling the Dynamics of Transferable Obligations in Business Procedures, May 1997, pp. 494–501.
"Automation of Cooperation of Business–Realization of Saving of Time and Management", Nikkei Computer, May 2, 1994, pp. 57–63.
"*FlowWare*" leaflet, Recognition Japan Inc.
"*HITACHI Product News*", Aug. 1995, Hitachi, Ltd.
"*Groupmax*" leaflet 1995, Hitachi, Ltd.
Berry et al "Business Re–engineering and Electronic Product Supply Chain" pp. 375–403, IEE, 1995.
Gracanineta "Software Environment for Simulation and Real–time Coordination of Manufacturing Systems" IEEE, 1995, pp. 1544–1547.

*Primary Examiner*—Kevin J. Teska
*Assistant Examiner*—Dan Fiul
*Attorney, Agent, or Firm*—Antonelli, Terry, Stout & Kraus, LLP

[57] ABSTRACT

A simulation system in a work flow control system confirms whether or not prepared business process defining information is valid. The simulation system receives as an input thereto a false case including a name of a document, an attribute name belonging to the document, and attribute values to be selected; virtually moves the false case from a node to another node according to the business process defining information, simulates a process conducted in each node, and generates a journal of these processes.

14 Claims, 9 Drawing Sheets

FIG.4A

| NODE NAME 401 | PRIOR NODE 402 | POSTERIOR NODE 403 | OPERATION 404 | CASE NAME 405 | ATTRIBUTE NAME 406 |
|---|---|---|---|---|---|
| WORK 1 | WORK 0 | OPERATION 1 | UPDATE | DOCUMENT 1 | EXAMINATION RESULT |
| OPERATION 1 | WORK 1 | WORK 2 WORK 3 | REFERENCE | DOCUMENT 1 | EXAMINATION RESULT |
| WORK 2 | OPERATION 1 | WORK 5 | / | / | / |
| WORK 3 | OPERATION 1 | WORK 4 | / | / | / |
| WORK 4 | WORK 3 | WORK 5 | UPDATE | DOCUMENT 2 | INDICATION NO. |

FIG.4B

| 407 | 408 | 409 | 410 |
|---|---|---|---|
| CASE NAME | ATTRIBUTE NAME | ATTRIBUTE TYPE | ATTRIBUTE VALUE LIST |
| DOCUMENT 1 | EXAMINATION RESULT | CHARACTER STRING TYPE | OK/NG |
| DOCUMENT 2 | AUTHOR | CHARACTER STRING TYPE | |
| DOCUMENT 2 | INDICATION NO. | INTEGER TYPE | 0,1,2 |

FIG.4C

| 411 | 412 | 413 | 414 | 415 |
|---|---|---|---|---|
| MODE NAME | CASE NAME | ATTRIBUTE NAME | ATTRIBUTE VALUE | NEXT NODE |
| OPERATION 1 | DOCUMENT 1 | EXAMINATION RESULT | OK | WORK 2 |
| OPERATION 1 | DOCUMENT 1 | EXAMINATION RESULT | NG | WORK 3 |

FIG.5

| 501 | 502 | 503 | 504 |
|---|---|---|---|
| CASE NAME | ATTRIBUTE NAME | ATTRIBUTE VALUE | ATTRIBUTE VALUE LIST |
| DOCUMENT 1 | EXAMINATION RESULT | CHARACTER STRING TYPE | OK / NG |

| 601 | 602 | 603 | 604 |
|---|---|---|---|
| CASE NAME | ATTRIBUTE NAME | ATTRIBUTE TYPE | ATTRIBUTE VALUE |
| DOCUMENT 1 | EXAMINATION RESULT | CHARACTER STRING | OK |

| NODE NAME | CASE NAME | ATTRIBUTE NAME | ATTRIBUTE TYPE | ATTRIBUTE TYPE | OPERATION |
|---|---|---|---|---|---|
| WORK 1 | DOCUMENT 1 | EXAMINATION RESULT | CHARACTER STRING TYPE | OK | UPDATE |
| OPERATION 1 | DOCUMENT 1 | EXAMINATION RESULT | CHARACTER STRING TYPE | OK | REFERENCE |

701 702 703 704 705 706

211

BUSINESS PROCESS SIMULATION SYSTEM

This is a continuation of U.S. patent application Ser. No. 08/582,628 filed Jan. 4, 1996, now U.S. Pat. No. 5,887,154.

BACKGROUND OF THE INVENTION

The present invention relates to a work flow control system and, in particular, to a business process simulation system for verifying correctness of information defining a business process.

To increase efficiency of business work in offices, there have been introduced work flow control systems. According to such a work flow control system, a flow of business steps to be achieved by a plurality of workers and operators is expressed as a flow of documents expressed in an electronic form for automation of the business for a higher efficiency in the performance of business.

The work flow control system is implemented by a general client-server system. The system includes, as shown in FIG. 10, a work flow (WF) definition client 1001 for defining business processes, a plurality of business clients 1002 for conducting business, and a work flow (WF) manager or WF server 1004 for managing business processes and circulating documents as objects of work. The clients and servers are connected to each other via a local area network (LAN) 1005. Moreover, depending on cases, the system includes an operation management client 1003 for controlling operation of the system.

FIG. 11 shows a software layout of the work flow control system. The system includes a business process description tools 101 for defining and describing business processes, business process defining information 104 generated by the business process description tool 101, and a business process program 1106 for executing business processes according to the business process defining information. The business process program 1106 further includes a node process program 1102 for deciding and controlling flows of documents between business clients and a document control program 1103 for requesting business to each business client and collecting documents. The business process definition tool 101 is executed in the WF definition client 1001 and the business process defining information 104 is stored in a memory of the WF manager 1004. The business process program 1106 is executed by the WF manager 1004.

As an example of the work flow control system, there exists a form control system in which orders of a plurality of items are accepted to conduct delivery, accounting, and stock control for the respective items through mutually different paths.

In this connection, for information related to the work flow control system, reference is to be made, for example, "Automation of Cooperation of Business—Realization of Saving of Time and Management" described in pages 57 to 63 of "Nikkei Computer" published on May 2, 1994.

In the work flow control system described above, there has been known as a business process simulation tool a flow rate simulation tool which simulates the quantity of documents passed to respective workers. However, the simulation tool of the prior art is a tool to evaluate performance of the business processes. Namely, the tool is not prepared to verify validity or appropriateness of the defined business processes.

As above, the conventional flow rate simulation is employed on premise that the business processes defined by the business process definition tool are valid. During operation of the work flow control system, there may possibly occur abnormal states as follows.

Case 1: Control is confined in a closed path in a loop.
Case 2: Control is unable to conduct transition to a subsequent node due to occurrence of an abnormal state such as a deadlock.

Cases 1 and 2 take place in most cases only when an attribute value or a combination of attribute values in a document is represented in a certain pattern. In consequence, the abnormal states can be recognized only when the document is actually passed to business processes in many cases and hence it is difficult to detect such abnormality only through a syntactic check of the business process defining information.

SUMMARY OF THE INVENTION

It is therefore an object of the present invention to provide a simulation system for verifying definitions of business processes for validity thereof.

In a simulation system of the present invention, a false document is virtually transferred from a node to another node according to information described to define a business process so as to trace transitions of the false document.

The false document will be called as a false case herebelow. The term "case" indicates a unit of data flowing through the system and includes at least one document. For simplification, a false case may also be called simply as a case. Each document has attributes and each attribute is related to a plurality of attribute values. For example, when the attribute is "examination result", it is indicated that the contents of the pertinent document are to be examined and the attributed value is "OK" or "NG" resulted from the examination.

In a business process of an actual work flow control system, there are included a work node for conducting work for a document arrived and updating attribute values of attributes belonging to the document and an operation node for referring to the attribute values at arrival of a document and deciding a node to which control is to be passed. Each work node corresponds to one work client 1002, whereas all operation nodes are associated with the WF manager 1004.

In the simulation system according to the present invention, the simulation is carried out only within the WF definition client in which the case is not actually transferred between nodes (clients). Therefore, the attribute values of the document cannot be actually updated in any work node. Consequently, before the false case is inputted to the system, attribute names and attribute values to be selected are beforehand added to the document name in the false case. Referring to the business process defining information, the system virtually transfers control between nodes for the false case thus supplied to the system. In the simulation system, the movement of the false case between the nodes and operations conducted in the respective nodes are stored as journal data. Moreover, the system monitors a period of time consumed to execute simulation. According to the journal data and execution time, it is possible to determine prior to the actual system operation whether or not the process defining information has been appropriately prepared.

In addition, the simulation system detects such abnormal cases as follows. For example, although a false case arrives at a work node or an operation node, the attribute names and/or attribute values are not suitable as those to be handled by the work or operation node; or, when a false case reaches an operation node, some attributes of the false case is not yet updated by a work node preceding the operation node.

BRIEF DESCRIPTION OF THE DRAWINGS

These and other objects and advantages of the present invention will become apparent by reference to the following description and accompanying drawings wherein:

FIGS. 4A to 4C are diagrams showing the data format of business process defining information 104;

FIG. 5 is a diagram showing the data format of case attribute information 209;

FIG. 6 is a diagram showing the data format of flow control attribute information 210;

FIG. 7 is a diagram showing the data format of an attribute information update journal 210;

DESCRIPTION OF THE PREFERRED EMBODIMENTS

Figure 1:
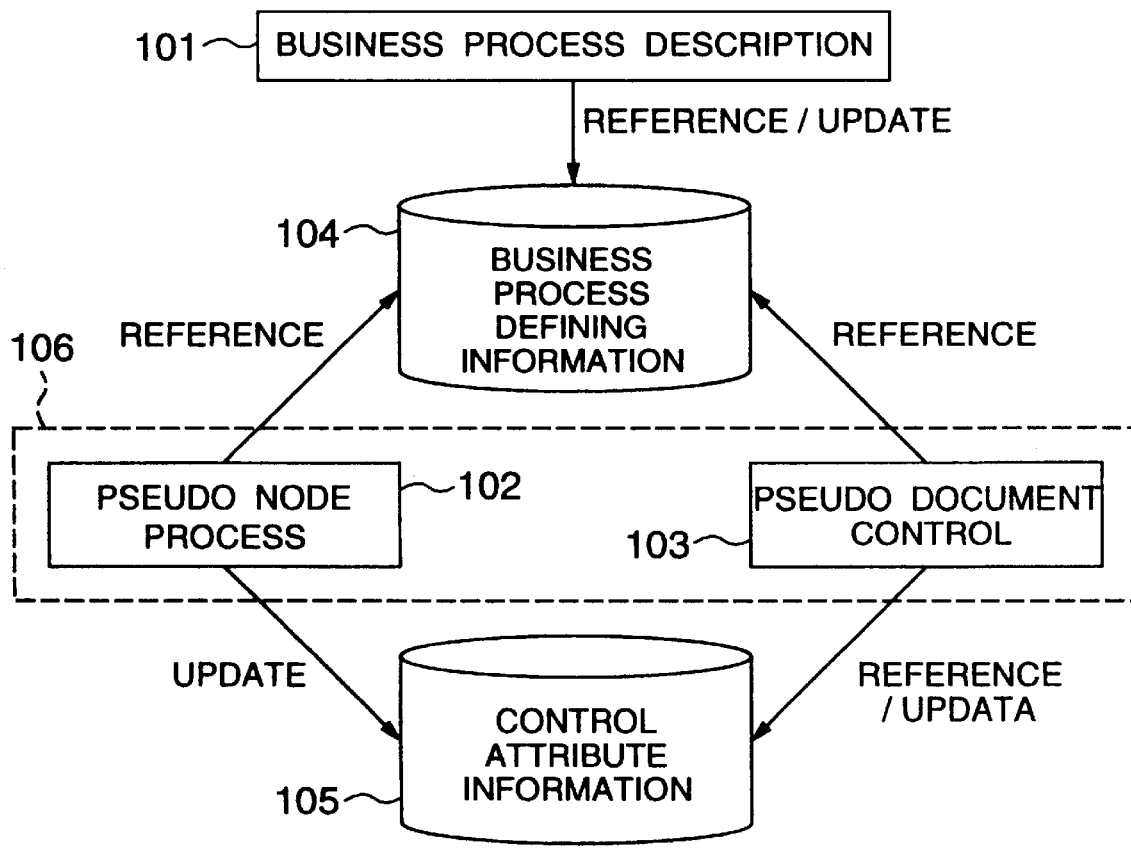
FIG. 1 is a diagram schematically showing the software configuration of a business process simulation system.

Referring now to the drawings, description will be given of an embodiment of a business process simulation system according to the present invention.

FIG. 1 shows in a block diagram of an outline of the software construction of the embodiment.

Figure 9:
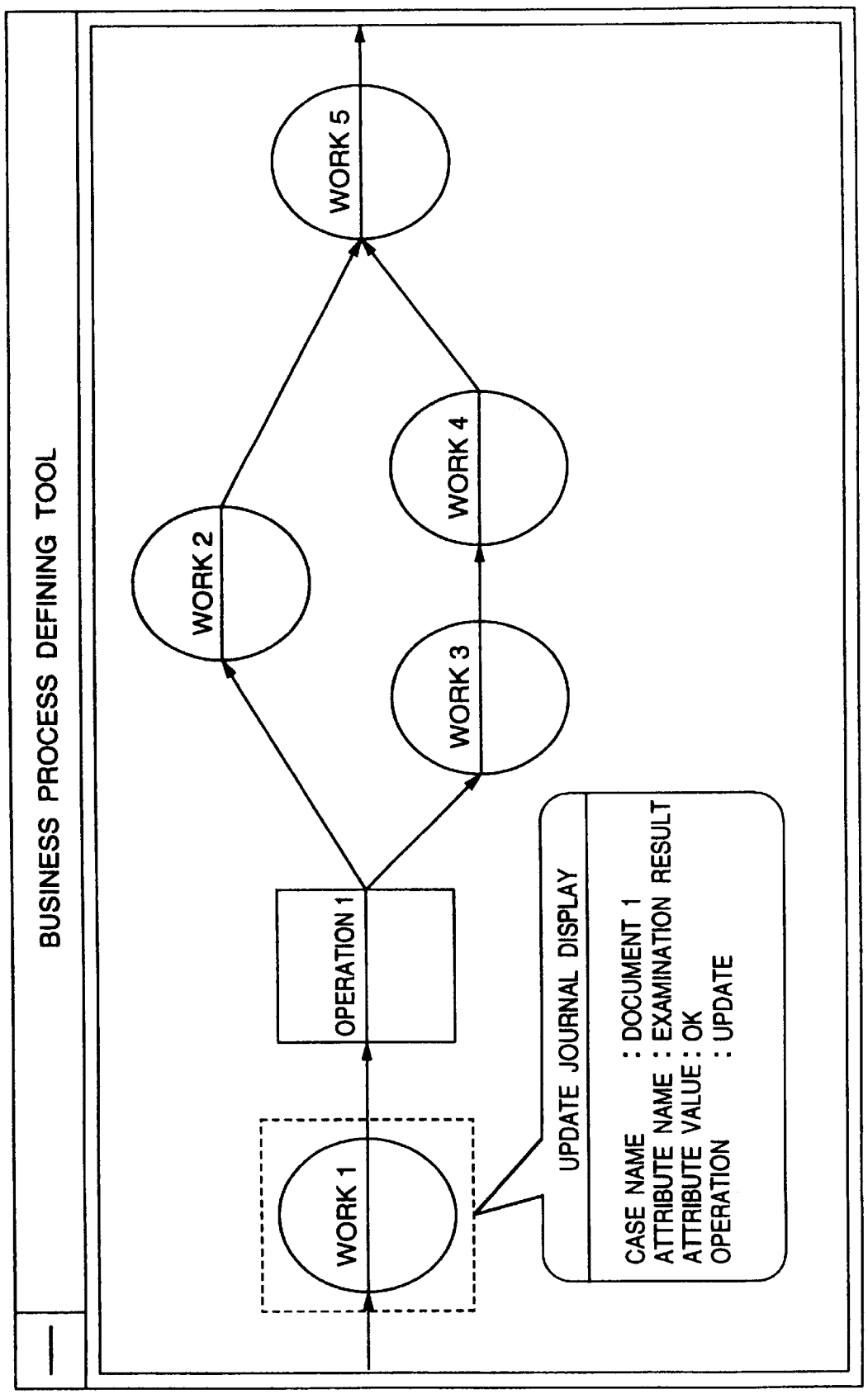
FIG. 9 is a diagram showing an example of a display screen presenting a process of simulation.
Figure 10:
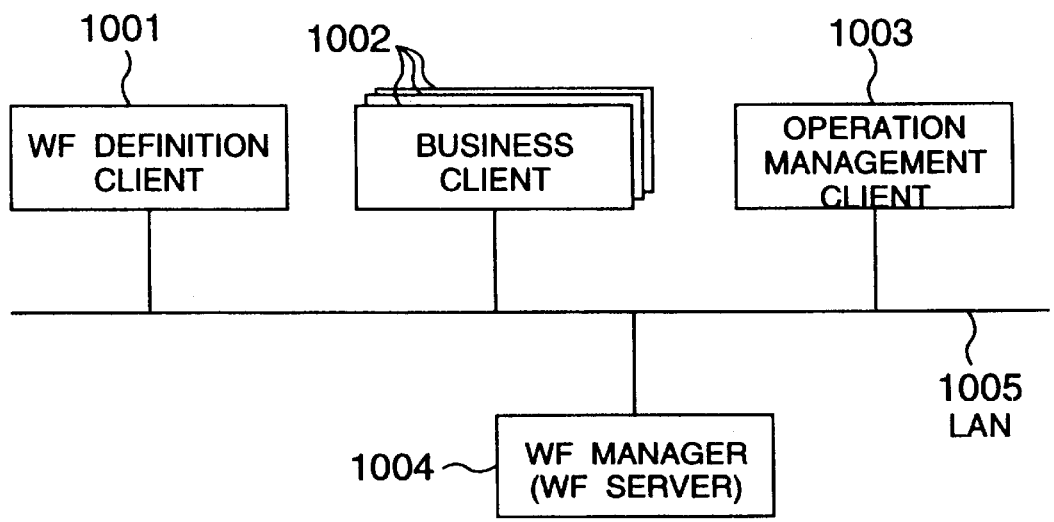
FIG. 10 is a diagram showing the system structure of a general work flow system.

In FIG. 1, reference numeral 101 indicates a business process description program for supporting work of the user to define a business process or to edit a defined business process via a display screen of a display. As shown in FIG. 9, a business process includes work nodes, operation nodes, and arrows establishing connections therebetween. The program 101 provides, for example, a template to define a business process via the screen, node icons to represent nodes, and a case to express a document and attributes belonging thereto, thereby helping the user define a business process. The program 101 stores the defined business process as business process defining information 104 in a storage. Furthermore, the program 101 supports work of the user in reading a business process from the business process defining information 104 and in editing and updating the process.

Figure 11:
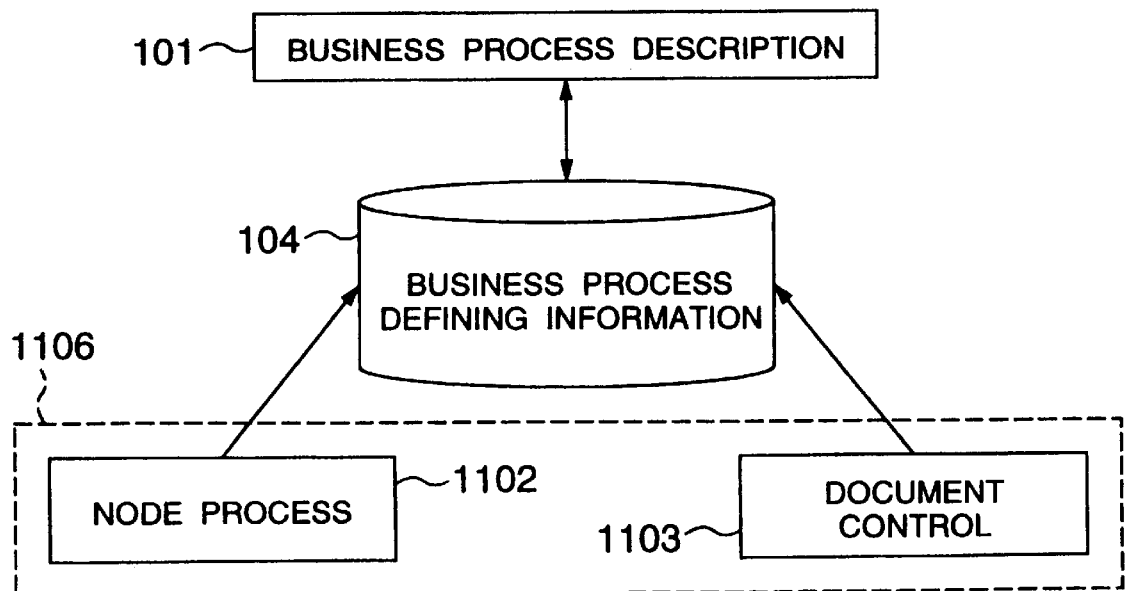
FIG. 11 is a diagram briefly showing the software configuration of the work flow system.

The business process description program 101 and business defining information 104 are the same as those of the work flow control system shown in FIG. 11. A simulation program 106 includes a pseudo node process program 102 and a pseudo document control program 103. The program 102 simulates processes of the respective work nodes and stores journals of operations as control attribute information 105 by referring to the business process defining information 104 and a false case. The pseudo document control program 103 conducts a process in which the false case is virtually transferred from the current node to a subsequent node according to the job process defining information 104 and the control attribute information 105 updated by the pseudo node process program 102.

The constituent elements shown in FIG. 1 exist ordinarily in the WF definition client 1001 and the simulation system can be implemented only by the WF definition client 1001. The business process defining information 104 thus verified by the simulation system is sent to a WF manager 1004. In consequence, the simulation system is actually realized by an information processing system such as a computer, a workstation, or a personal computer which is employed as the WF definition client.

Figure 3:
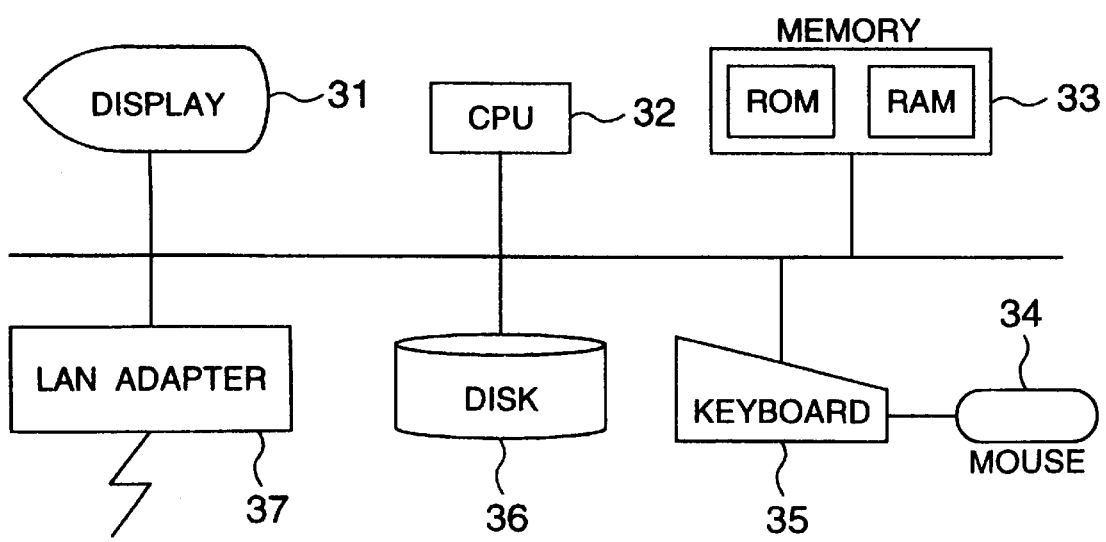
FIG. 3 is a diagram showing the hardware constitution of a general work flow definition client.

FIG. 3 shows the hardware construction of a general WF definition client. In this configuration, business process defining information 104 and control attribute information 105 are stored in a disk unit 36 or a memory 33 connected to the information processor. The business process description program 101, pseudoe node process program 102, and pseudo document control program 103 are stored on the disk of the information processor. Functions of these programs are effected by executing the programs by a central processing unit (CPU) 32. In this regard, the information processor is connected to input devices such as a keyboard 35 and a mouse 34 for the user to input data and instructions to the simulation system and a display 31 for presenting thereon a diagram of business processes. Furthermore, the WF definition client includes an LAN adapter 37 to link the WF definition client to an LAN, which adapter is unnecessary for the simulation, and a flexible disk unit (not shown) to store therein copies of information items.

Figure 2:
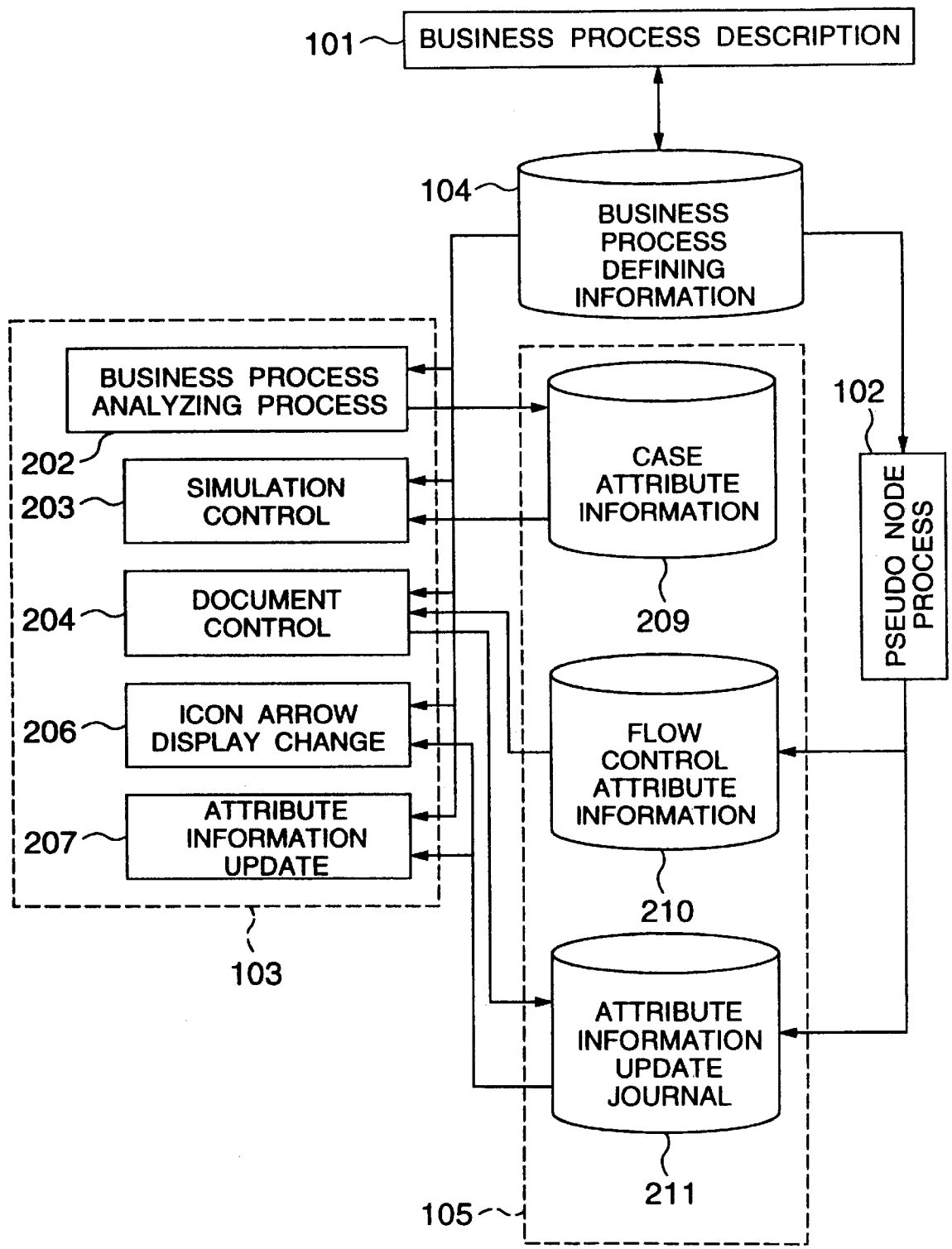
FIG. 2 is a block diagram showing the pseudo document control program 103 and control attribute information 105.

FIG. 2 shows in a detailed block diagram the control attribute information 105 and pseudo document control program 103. The information 105 includes case attribute information 209, flow control attribute information 210, and an attribute information update journal 211. Stored in the case attribute information 209 are information items extracted from the business process defining information 104, the items being related to attributes of documents referenced by operation nodes. In the flow control attribute information 210, there are temporarily stored attribute values updated during the simulation. The information 210 is referenced to select a subsequent work node when the document reaches an operation node. When an attribute value is updated in a work node or an attribute is referenced in an operation node, journal information thereof is stored in the attribute information update journal.

The pseudo document control program 103 includes a business process analysis process program 202, a simulation control program 203, a document control program 204, an icon arrow display change program 206, and a journal information update journal display program 207. The analysis process program 202 analyzes the business process defining information to generate case attribute information 209, which will be described in details later. The simulation control program 203 references the business process defining information 104 and case attribute information 209 to invoke the pseudo node process program 102, document control program 204, and icon arrow display change program 206 so as to control the flow of simulation. The program 102 references the business process defining information 104. If it is found that any attribute to be referenced by a subsequent operation node have already updated in a work node, the program 102 adds (or updates) information associated with the updated attribute value to the flow control attribute information 210. Moreover, the pseudo node process program 102 stores journal information of the update of the attribute value in the attribute information update journal 211. When the current node is an operation node, the document control program 204 references the business process defining information 104 to effect transition to the subsequent node. When the current node is a control node, the program 204 references the business process defining information 104 and flow control attribute information 210 to determine an operation node for the next transition of control and then stores in the attribute information update journal 211 journal data indicating a reference operation to attributes in the control node. The icon arrow display change program 206 is responsive to a request from the user to acquire from the business process defining information 104 a business process definition specified by the user, generates a diagram of business processes as shown in FIG. 9, and then presents the diagram on the screen of the display. Additionally, each time control is passed to a new node, the icon arrow display change program 206 is activated by the simulation control program 203 to emphasize presentation of an icon and an arrow related to the transition on the display screen. The journal information update journal display program 207 references, in response to a request from the user, the attribute information update journal 211 related to a node specified by the user to display journal information of the node on the screen.

FIGS. 4A to 4C are diagrams for explaining the data format of business process defining information 104. FIG. 4A shows a connecting relationship between nodes of a business process. A numeral 401 indicates a name assigned to each node. The name is used to discriminate a work node from an operation node. Numerals 402 and 403 stand for lists respectively of node names of the preceding and succeeding stages of the pertinent nodes. A numeral 404 is defined for attribute of a case when there exists an operation to be executed by the node for the case. A numeral 405 denotes a case name related to the operation and a numeral 406 is an attribute name specified as an object of operation.

FIG. 4B shows a list of attributes of each case. Namely, the list includes attributes available for each case and each attribute. For example, for attribute name=examination result, OK or NG is available as the attribute value. For attribute name=author, the value is set when the related business process is executed and hence is not determined in a stage of defining the business process.

FIG. 4C is a list of control information in an operation node. For each available attribute value, this list includes a name of a work node for the next transition. For example, in node "operation 1", if the examination result is "OK", the next work node is work 2; whereas, if the result is "NG", control is transferred to work 3.

To generate the data items of FIGS. 4A to 4C, the user inputs data according to the business process description program 104.

FIG. 5 is an explanatory diagram of the data format of case attribute information 209. The information 209 includes information related to a correspondence between a case and attribute names referenced by operation nodes according to the business process defining information 104 and information about a set of available attributes values. The information 209 is created by the business process analysis process program 202.

FIG. 6 is a diagram for explaining the data format of flow control attribute information 210. To control the flow of the pertinent case, the current attribute values of particular attributes are temporarily stored in the information 210. In the instance of FIG. 6, the attribute value 604 is set to "OK" as the examination result for case name 601=document 1 and attribute value 602=examination result. The list of information 210 is produced by the pseudo node process program 102.

FIG. 7 is an explanatory diagram of the data format of the attribute information journal 211. The journal 211 includes a journal of an update operation in which the flow of the case is altered in a work node and a journal of a reference operation carried out in an operation node. The journal 211 is created by the document control program 204 and pseudo node process program 102.

Subsequently, description will be given of a processing procedure of the business process analysis process program 202. The program 202 references the business process defining information of FIG. 4A to obtain information defining a connective relationship between nodes and then extracts therefrom information defining an operation node according to a node name. Adopting next, as a retrieval key, attribute name 406 of the operation object referenced by the operation node, the program 202 conducts a retrieval through the business process defining information 104 of FIG. 4B to obtain information defining the case and then extracts therefrom case name 407 related to the attribute name so as to acquire attribute type 409 and attribute value list 410 for the pertinent attribute. The program 202 stores the obtained information in the case attribute information 209 in the form of case name 501, attribute name 502, attribute type 503, and attribute value list 504 as shown in FIG. 5. The program 202 repeats the process for all operation nodes in the business process defining information 104. The business process analysis process program 202 is executed when the information 104 is generated or changed.

Figure 8:
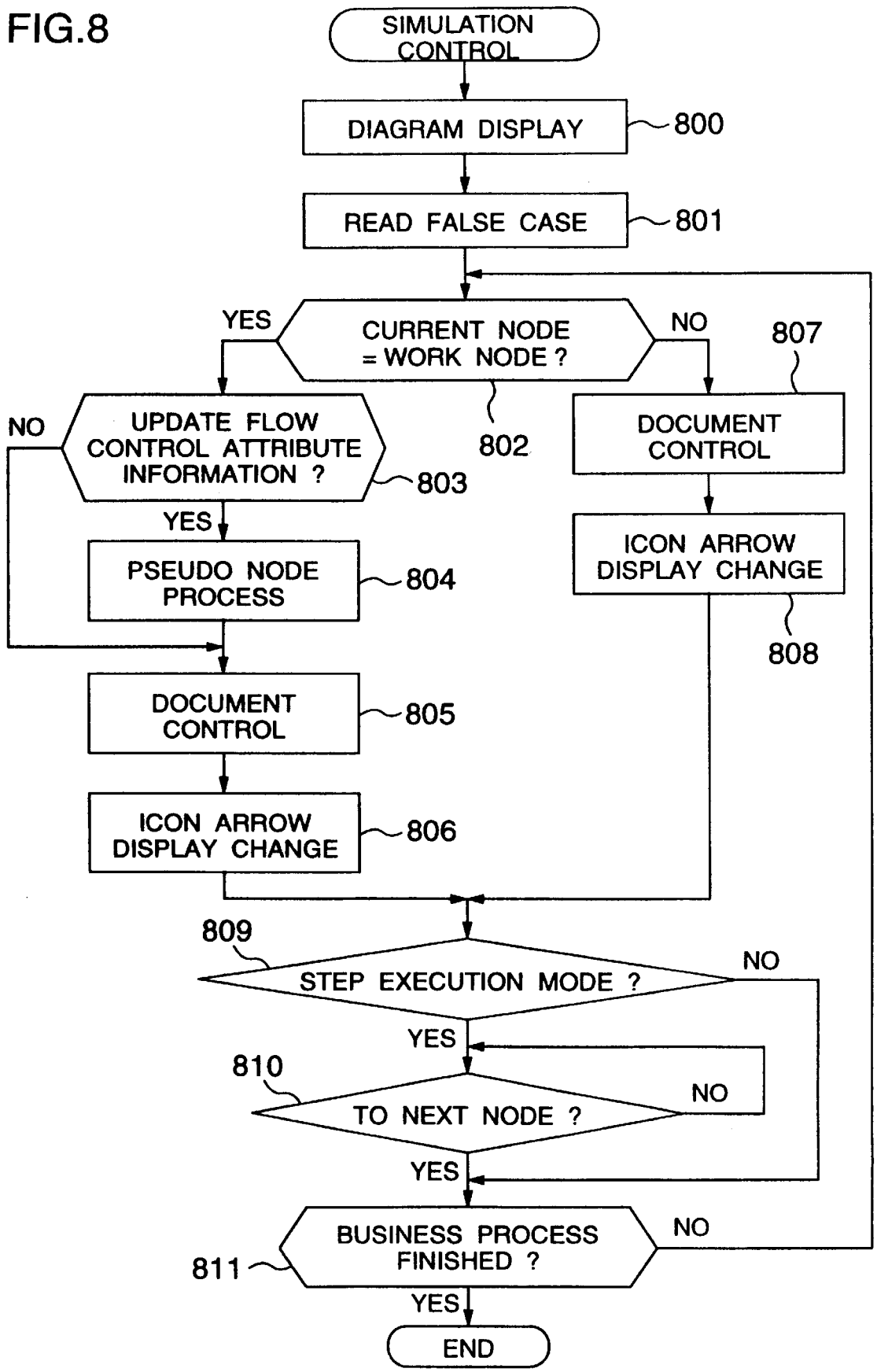
FIG. 8 is a flowchart showing the flow of a simulation control program.

FIG. 8 is a diagram for explaining the process of the business process simulation control program 203. In the flow chart, the process is primarily centered on the simulation control program 203 and hence the pseudo node process program 102, document control program 204, and icon arrow display change program 206 are invoked when necessary. First, the simulation control program 203 initiates the display change program 206 to present the diagram of the overall business process (step 800). Next, the program 203 reads a false case from an input device or a storage such as a disk to start simulation of the business process (step 801). The false case is denoted in the form including a case name, an attribute name, and an attribute value. In this embodiment, there can be inputted a case expressed as case name=document 1, attribute name=examination result, attribute value OK or NG and a case expressed as case name=document 2, attribute name=author, attribute value= (name), attribute name=indication no., attribute value 0, 1, or 2. Next, referring to node name 401 of the business process defining information 104 (FIG. 4), the program 203 acquires the first node to decide whether or not the node is a work node (step 802). In the embodiment, since the first node is a work node as denoted by work 1, control is passed to step 803. In this step, the program 203 conducts judgement to add information to the flow control attribute information 210 or to update information stored therein. Specifically, according to case name 405 and attribute name 406 of the operation object for the pertinent node, the program 203 references a related record in the case attribute information 209 of FIG. 5. The program 203 decides whether or not the attribute of the false case has already been registered to the case attribute information 209. The information 209 includes a list of data items to be referenced by operation nodes. In consequence, when case name 405 and attribute name 406 of the operation object are referenced by a succeeding operation node, these items are registered to the information 209 in advance, and hence it is required to update the flow control attribute information 210. An attribute name of document 1 which passes a node of work 1 is registered to the information 209 and is therefore referenced by an-operation node in this embodiment. Consequently, the pseudo node process program 102 is activated (step 804). In other cases, control is transferred to step 805.

The pseudo node process program 102 accesses the business process defining information 104 to reference case name 405 of the operation object of the pertinent node, attribute name 406 of the operation object, and operation 404 for the attribute of the case and resultantly stores a journal of execution of "update" which is the operation indicated by "operation 404" matching the attribute name of the false case. Since the attribute value is beforehand set to the false case, the attribute value is not actually updated. However, regardless of the values set to the false case, the program 102 may request via the display the user to update the attribute value such that the user responsively inputs an attribute value from the input device. Furthermore, when the attribute name and attribute value of the false case are different from those of the business process defining information 104, the program 102 displays a message of the condition and then terminates the simulation. The pseudo node process program 102 adds case name 601, attribute name 602, attribute type 603, and attribute value 604 to the flow control attribute information 210 as shown in FIG. 6. Moved to attribute type 603 is attribute type 409 of which attribute name 408 matches "examination result" for document 1. The attribute name of the inputted false case is set to attribute value 604. Subsequently, since the attribute value is updated in this node, the program 102 stores the pertinent journal information in the attribute information update journal 211. That is, as can be seen from FIG. 7, node name 701, case name 702, attribute name 703, attribute type 704, attribute value 705, and operation 706 are stored in the journal 211. Operation 404 associated with the attribute of the case is moved to operation 706. When the pseudo node process program 102 is finished as above, the simulation control program 203 invokes the document control program 204 (step 805).

The program 204 moves the false case from the current node to the subsequent node in a virtual manner. The current node is a work node in step 805 and hence the program 204 accesses list 403 of the process defining information 104 to acquire a node name succeeding the current node and then returns control to the simulation control program 203. In step 806, the program 203 activates the icon arrow display change program 206 to display in an emphasized mode the next node and an arrow pointing the next node on the display screen. If the current node is the first node in the process, the current node is presented also in the emphasized mode.

When the current node is an operation node (NO in step 802), the simulation control program 203 immediately invokes the document control program 204 (step 807). The program 204 virtually transports the document from the operation node to a subsequent node and stores a journal of the operation. That is, the program 204 obtains from the information 104 the case name 405 and attribute name 406 referenced by the pertinent operation node to conduct retrieval through the flow control attribute information 210 using the case and attribute names as as a retrieval key so as to reference attribute value 604 corresponding to case name 601 and attribute name 602 resultant from the retrieval. If such data is missing in the information 210 or portion thereof is missing, the program 204 displays a message notifying the situation and then terminates the simulation. Next, the program 204 adds journal information of the operation to the attribute information change journal 211.

The current operation node name is stored as node name 701 and the associated case name 601, attribute name 602, attribute type 603, and attribute value 604 of the flow control attribute information 210 are copied onto case name 702, attribute name 703, attribute type 704, and attribute value 705. The operation 404 related to the attribute of the case is moved to operation 706. The document control program 204 then references list 403 of the business process defining information 104 to attain a candidate of a node next to the current node. Using as a key the node name 411, case name 412, attribute name 413, and attribute value 414, the program 204 carries out a retrieval through the branch condition definitions of operation nodes in the information 104 to decide node 415 next to an entry satisfying the retrieval condition, thereby returning control to the simulation control program 203. In the node of operation 1 of this embodiment, attribute value 604 is "OK" in the flow control attribute information 210, the program 203 selects operation 2 as the succeeding node and then passes control to step 303. Thereafter, the program 203 initiates the icon arrow display change program 206 to emphasize presentation of the next node and an arrow indicating the next node on the display screen (step 808).

For the simulation control program 203, the user can specify in advance a step execution node in which program execution can be stopped for each node or a successive execution mode in which the stepwise termination of the node is unavailable. In case where the flow of the case is confirmed by the emphasized presentation of arrows and nodes, it is favorable to specify the step execution mode. In step 809, the program 203 decides whether or not the step execution mode is specified. If this is the case, control is not passed to the next node until an associated indication is supplied from the user (step 810). When such a user's indication is received from the user, the program 203 starts processing of the next node when the successive execution mode is specified. If the next node is missing, the program 203 assumes termination of the business process (step 811) and then finishes the simulation. Otherwise, the program 203 returns control to step 802.

As above, for example, when a false case is inputted to the system in the form of case name=document 1, attribute name=examination result, attribute value=OK, it can be understood from the emphasized display on the screen and the attribute information update journal 211 that the case is transferred in a sequence of work 1, operation 1, work 2, and work 5 according to the business process definition. Similarly, when a false case is supplied to the system in the form of case name=document 1, attribute name= examination result, attribute value=NG, it can be recognized that the case is processed in an order of work 1, operation 1, work 3, work 4, and work 5 in accordance with the business process definition.

FIG. 9 shows a process of the business process simulation presented on the screen of the display. For a business process, the icon arrow display change program 206 references the business process defining information 104 to generate and display a diagram in which nodes thereof are connected to each other by arrows. In addition, each time the document control program 204 is executed, the program 206 is activated to change display colors, width of lines, and line types of the current node and an arrow pointing the node so as to present these items in the emphasized mode. Moreover, in response to an instruction inputted by the user from an input device such as a mouse, the program 206 invokes the journal information change journal display program 207. According to the specified node, the program 207 accomplishes a retrieval through the business process defining information 104 such that when the pertinent node is a work node, the program 207 conducts a retrieval through the journal 211 using as a retrieval key the node name 401, case name 405 as the operation object, and attribute name 406 thereof, operation 404 for the attribute of the case. As a result, the program 207 displays journal information associated with the node as shown in FIG. 9. The display change program 206, which is initiated by the simulation control program 203, can also be invoked directly by the user to display journal information for confirmation.

Incidentally, case attribute information 209 and flow control attribute information 210 are employed to carry out the business process simulation in the embodiment. However, the information above is adopted as means for realizing the data update and node transition and hence can be replaced with information of another form such as a table or a flag.

Furthermore, by monitoring a period of execution time of the simulation control program 203 in the successive execution mode, it is possible to advantageously detect as an error a loop in which control infinitely runs through a particular closed path.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An electronic document circulation simulation system provided on a single computer, said electronic document circulation simulation system comprising:

means for storing business process defining information indicating circulation destinations of an electronic document in a disk unit or memory of the single computer;

circulation simulation means for simulating a circulation of the electronic document according to said business process defining information; and means for storing attribute information of the electronic document in a disk unit or memory of the single computer, and for updating said attribute information stored in the disk unit or memory of the single computer according to the results of the simulated circulation of the electronic document by the circulation simulation means.

2. An electronic document circulation simulation system according to claim 1, wherein said business process defining information includes information corresponding to at least one work node which updates the electronic document, and said circulation simulation means includes a pseudo node processing means which simulates a predetermined process of said at least one work node when the electronic document is circulated to said at least one work node in the simulated circulation of the electronic document.

3. An electronic document circulation simulation system according to claim 2, wherein said business process defining information includes information respectively corresponding to a plurality of work nodes, each of said plurality of work nodes corresponding to a client on a client/server network.

4. An electronic document circulation simulation system according to claim 1, wherein said business process defining information includes information corresponding to at least one operation node which references the electronic document, and said circulation simulation means includes a pseudo node processing means which simulates a predetermined process of said at least one operation node when the electronic document is circulated to said at least one operation node in the simulated circulation of the electronic document.

5. An electronic document circulation simulation system according to claim 4, wherein said business process defining information includes information respectively corresponding to a plurality of operation nodes, each of said plurality of operation nodes being associated with a server on a client/server network managing and executing an electronic document circulation system on said client/server network.

6. A method of simulating the operation of an electronic document circulation system on a single computer, said method comprising:

storing business process defining information indicating circulation destinations of an electronic document;

storing attribute information of the electronic document;

simulating a circulation of the electronic document according to said stored business process defining information; and updating said stored attribute information according to the results of the simulated circulation of the electronic document according to said stored business process defining information.

7. A method of simulating the operation of an electronic document circulation system according to claim 6, wherein said business process defining information includes information corresponding to at least one work node which updates the electronic document, and said step of simulating a circulation of the electronic document simulates a predetermined process of said at least one work node when the electronic document is circulated to said at least one work node in the simulation.

8. A method of simulating the operation of an electronic document circulation system according to claim 6, wherein said business process defining information includes information corresponding to at least one operation node which references the electronic document, and said step of simulating a circulation of the electronic document includes simulating a predetermined process of said at least one operation node when the electronic document is circulated to said at least one operation node.

9. A method of simulating the operation of an electronic document circulation system according to claim 6, wherein data, including at least said electronic document, is virtually transferred from one node to another node according to said business process defining information, so as to trace transitions of the data and verify the validity of said business process defining information.

10. A method of simulating the operation of an electronic document circulation system according to claim 9, wherein attribute values are selected and added to the electronic document in said data before the data is virtually transferred.

11. A method of simulating the operation of an electronic document circulation system according to claim 9, wherein the transfer of the data including the electronic document between the nodes and the transitions of the data are stored as journal data and the business process defining information is verified as being valid according to the journal data and the time required for execution of the simulation.

12. A tangible medium storing a simulation program which, when executed in a computer, causes the computer to perform a method of simulating the operation of an electronic document circulation system on a single computer, said method comprising:

storing business process defining information indicating circulation destinations of an electronic document;

storing attribute information of the electronic document;

simulating a circulation of the electronic document according to said stored business process defining information; and updating said stored attribute information according to the results of the simulated circulation of the electronic document according to said stored business process defining information.

13. An electronic document circulation simulation system according to claim 1, wherein said business process defining information is shared with an electronic document circulation system.

14. An electronic document circulation simulation system according to claim 1, wherein said business process defining information defines the attributes of the electronic document and a plurality of attribute values related to each attribute.

* * * * *